United States Patent
Raff et al.

(10) Patent No.: US 12,393,366 B1
(45) Date of Patent: Aug. 19, 2025

(54) SERVICING READ REQUESTS

(71) Applicant: Dell Products L.P., Round Rock, TX (US)

(72) Inventors: Jason Raff, Bedford, NH (US); Vikram Prabhakar, Apex, NC (US); Socheavy Heng, Framingham, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/662,199

(22) Filed: May 13, 2024

(51) Int. Cl.
  *G06F 3/06* (2006.01)
(52) U.S. Cl.
  CPC .......... *G06F 3/0656* (2013.01); *G06F 3/0611* (2013.01); *G06F 3/0659* (2013.01); *G06F 3/067* (2013.01)
(58) Field of Classification Search
  None
  See application file for complete search history.

(56) References Cited

U.S. PATENT DOCUMENTS

| | | |
|---|---|---|
| 11,055,028 B1 | 7/2021 | Kamran et al. |
| 11,481,291 B2 | 10/2022 | Kamran et al. |
| 11,494,405 B2 | 11/2022 | Chen et al. |
| 11,599,460 B2 | 3/2023 | Derzhavetz et al. |

FOREIGN PATENT DOCUMENTS

JP   3547511 B2 * 7/2004 ............. G06Q 40/00

* cited by examiner

*Primary Examiner* — Brian R Peugh
(74) *Attorney, Agent, or Firm* — BainwoodHuang

(57) ABSTRACT

A technique is directed to servicing a read request. The technique includes establishing a set of write indicators corresponding to a set of storage locations designated by the read request. The technique further includes, while the set of write indicators is accessible to a possible write operation that designates the set of storage locations to be written to, buffering data from the set of storage locations. The technique further includes, after buffering the data from the set of storage locations, checking the set of write indicators to ascertain whether the set of storage locations has been designated to be written to since establishing the set of write indicators.

19 Claims, 6 Drawing Sheets

SERVICING READ REQUESTS

BACKGROUND

Conventional data storage systems include storage processors (or nodes) and storage devices. The storage processors write data into the storage devices and read data from the storage devices in response to input/output (I/O) commands from host computers.

Some conventional data storage systems have multi-node active/active configurations. In conventional multi-node active/active configurations, a first node is able to process I/O commands independently of a second node. Moreover, if the first node fails, the second node may be able to continue processing I/O commands so that the configuration as a whole remains operational.

SUMMARY

Unfortunately, there are deficiencies to the above-described conventional multi-node active/active configuration. Along these lines, it is possible that the first node and the second node attempt to access data residing at the same addresses. For example, the first node may attempt to read data from the addresses while the second node attempts to write (or update) data to the addresses. To maintain data coherency, the nodes use locks to manage access to the addresses (e.g., the first node may obtain a lock on the addresses while reading the data to prevent the second node from overwriting/modifying the data until the first node finishes). Use of such locks is expensive in terms of resource utilization and overhead (e.g., processing cycles, memory space, waiting times, latency, and so on).

In contrast to the above-described conventional multi-node active/active configuration that uses locks to manage access to addresses, improved techniques are directed to operating storage processing circuitry to service read requests without obtaining locks. Along these lines, when servicing a read request, the storage processing circuitry creates write indicators (e.g., placeholders used to identify write requests) for respective storage locations designated in the read request. After buffering data from the storage locations, the storage processing circuitry checks the write indicators to ascertain whether any write requests have designated the same storage locations as the read request. These techniques enable the storage processing circuitry maintain data integrity without the overhead and resources needed to obtain and use locks.

One embodiment is directed to a method of servicing a read request. The method includes establishing a set of write indicators corresponding to a set of storage locations designated by the read request. The method further includes, while the set of write indicators is accessible to a possible write operation that designates the set of storage locations to be written to, buffering data from the set of storage locations. The method further includes, after buffering the data from the set of storage locations, checking the set of write indicators to ascertain whether the set of storage locations has been designated to be written to since establishing the set of write indicators.

Another embodiment is directed to an electronic environment that includes a memory and control circuitry coupled with the memory. The memory stores instructions that, when carried out by the control circuitry, cause the control circuitry to perform a method of servicing a read request, the method including:

(A) establishing a set of write indicators corresponding to a set of storage locations designated by the read request;
(B) while the set of write indicators is accessible to a possible write operation that designates the set of storage locations to be written to, buffering data from the set of storage locations; and
(C) after buffering the data from the set of storage locations, checking the set of write indicators to ascertain whether the set of storage locations has been designated to be written to since establishing the set of write indicators.

Yet another embodiment is directed to a computer program product having a non-transitory computer readable medium that stores a set of instructions to service a read request. The set of instructions, when carried out by computerized circuitry, causes the computerized circuitry to perform a method of:

(A) establishing a set of write indicators corresponding to a set of storage locations designated by the read request;
(B) while the set of write indicators is accessible to a possible write operation that designates the set of storage locations to be written to, buffering data from the set of storage locations; and
(C) after buffering the data from the set of storage locations, checking the set of write indicators to ascertain whether the set of storage locations has been designated to be written to since establishing the set of write indicators.

In some arrangements, the method further includes, after checking the set of write indicators, providing the buffered data to a host based on the set of write indicators indicating that the set of storage locations has not been designated to be written to since establishing the set of write indicators.

In some arrangements, the method further includes, based on the set of write indicators indicating that the set of storage locations has not been designated to be written to since establishing the set of write indicators, establishing a set of descriptors constructed and arranged to provide access to the buffered data from a cache.

In some arrangements, establishing the set of descriptors includes:

(A) modifying the set of write indicators to disassociate the set of write indicators from the set of storage locations; and
(B) associating the set of descriptors with the set of storage locations, the set of descriptors including a set of pointers to the buffered data in the cache.

In some arrangements, the method further includes, after establishing the set of descriptors, receiving a subsequent read request designating the set of storage locations to access. Additionally, the method further includes, in response to receiving the subsequent read request, providing an instruction to retain the buffered data in the cache to prevent the buffered data from being removed from the cache. Additionally, the method further includes, after providing the instruction to retain the buffered data, providing the buffered data from the cache to service the subsequent read request.

In some arrangements, the method further includes, after establishing the set of write indicators, receiving another read request designating the set of storage locations to access. Additionally, the method further includes, after receiving the other read request, performing a lookup operation that identifies the set of write indicators corresponding to the set of storage locations. The set of write indicators indicate a cache miss for the data corresponding to the set of storage locations.

In some arrangements, establishing the set of write indicators includes:

(A) performing a lookup operation that hashes metadata of the set of storage locations to identify a set of index values of a hash table; and (B) after performing the lookup operation, inserting the set of write indicators into the hash table at the set of index values to associate the set of storage locations with the set of write indicators.

In some arrangements, the method further includes establishing a second set of write indicators corresponding to a second set of storage locations designated by a second read request. Additionally, the method further includes, after establishing the second set of write indicators, receiving a write request designating the second set of storage locations to be written to. Additionally, the method further includes, in response to receiving the write request, modifying the second set of write indicators to indicate that the second set of storage locations has been designated to be written to.

In some arrangements, the method further includes, while the second set of write indicators is accessible to the possible write operation that designates the second set of storage locations, buffering other data from the second set of storage locations. Additionally, the method further includes, after buffering the other data from the set of storage locations, checking the second set of write indicators to ascertain whether the second set of storage locations has been designated to be written to since establishing the second set of write indicators. Additionally, the method further includes, after checking the second set of write indicators, refraining from providing the other data to a host based on the second set of write indicators indicating that the second set of storage locations has been designated to be written to since establishing the second set of write indicators.

This Summary is provided merely for purposes of summarizing some example embodiments so as to provide a basic understanding of some aspects of the disclosure. Accordingly, it will be appreciated that the above-described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

An improved technique is directed to operating storage processing circuitry to service read requests without obtaining locks. Along these lines, when servicing a read request, the storage processing circuitry creates a set of write indicators (e.g., placeholders used to identify write requests) for storage locations designated in the read request. After buffering data, the storage processing circuitry checks the write indicators to ascertain whether any write requests have designated the same storage locations as the read request. Thus, the storage processing circuitry maintains data integrity without needing to spend resources on obtaining locks on the storage locations.

Figure 1:
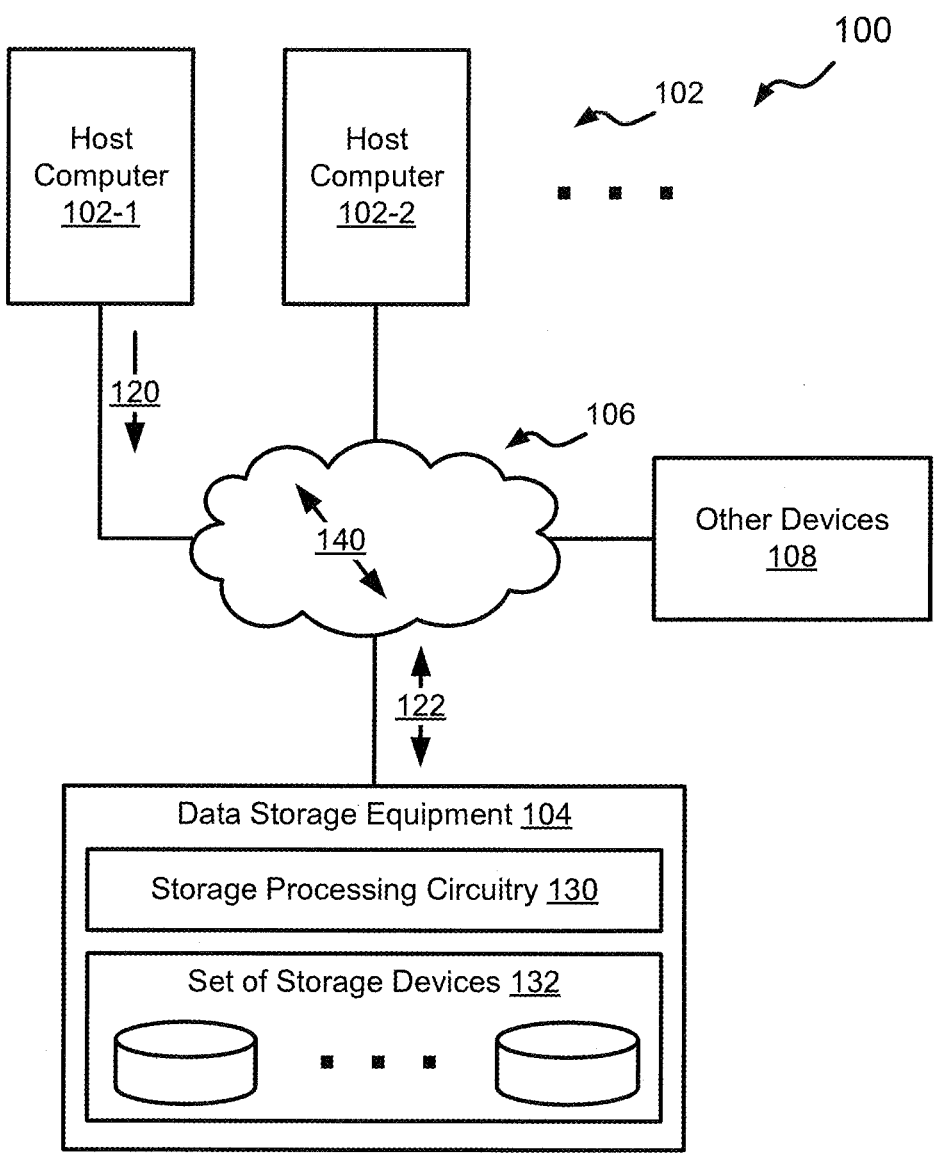
FIG. 1 is a block diagram of an example environment in accordance with certain embodiments.

FIG. 1 shows an example electronic environment 100 that manages IO operations in accordance with certain embodiments. The electronic environment 100 includes host computers 102(1), 102(2), . . . (collectively, host computers 102), a storage array 104, a communications medium 106, and optionally other devices 108.

Each of the host computers 102 is constructed and arranged to perform useful work. In some embodiments, one or more of the host computers 102 operate as a file server, a web server, an email server, an enterprise server, a database server, a transaction server, combinations thereof, etc. which provide host input/output (I/O) requests 120 to the data storage equipment 104. In some embodiments, the host computers 102 provide a variety of different host I/O requests 120 (e.g., block and/or file-based write commands, block and/or file-based read commands, combinations thereof, etc.) that direct the data storage equipment 104 to richly and reliably store host data 122 within and retrieve the host data 122 from storage (e.g., primary storage or main memory, secondary storage, tiered storage, combinations thereof, etc.).

The data storage equipment 104 (e.g., a storage array, a storage system, etc.) includes storage processing circuitry 130 and a set of storage devices 132. In some embodiments, the storage processing circuitry 130 includes one or more physical storage processors (SPs) or engines, data movers, director boards, blades, I/O modules, storage device controllers, switches, other hardware, combinations thereof, and so on.

In some embodiments, the storage processing circuitry 130 is constructed and arranged to respond to the host I/O requests 120 from the host computers 102 by writing data into and reading the data from the set of storage devices 132.

In some embodiments, the storage processing circuitry 130 is constructed and arranged to buffer data from the set of storage devices 132 to a cache. In some embodiments, the storage processing circuitry 130 is constructed and arranged to provide the buffered data to the host computers 102 to service read requests. In some embodiments, the storage processing circuitry 130 is constructed and arranged to receive data from the host computers 102 to service write requests.

In some embodiments, the storage processing circuitry 130 is constructed and arranged to establish a set of write indicators corresponding to a set of storage locations designated by a read request. In some embodiments, the set of write indicators are accessible to write operations that designate the set of storage locations to be written to. In some embodiments, the storage processing circuitry 130 is constructed and arranged to check the set of write indicators to ascertain whether the set of storage locations has been designated the set of storage locations to be written to.

In some embodiments, the storage processing circuitry 130 is constructed and arranged to establish a set of descriptors corresponding to the set of storage locations. In some embodiments, the set of descriptors include a set of pointers to buffered data in cache.

The set of storage devices 132 is constructed and arranged to provide persistent/non-volatile storage in accordance with one or more RAID data protection schemes. In some embodiments, the set of storage devices 132 includes one or more types of storage drives, e.g., non-volatile random access memory (NVRAM) devices, solid state drives (SSDs), hard disk drives (HDDs), combinations thereof, and so on. In some embodiments, at least some devices of the set of storage devices 132 provide non-volatile storage using a mapped-RAID architecture. Moreover, in accordance with certain embodiments, various physical componentry may be virtualized for additional flexibility, fault tolerance, load balancing, and so on (e.g., virtual data movers, virtual storage devices, etc.).

In some embodiments, the host I/O requests 120 include read requests that designate storage locations from which to read data. In some embodiments, the host I/O requests 120 include write requests that designate storage locations at which to write data. In some embodiments, the storage locations are pages of a logical block address (LBA) space mapped to the set of storage devices 132. In some embodiments, the pages are logical units at which the LBA space is managed.

The communications medium 106 is constructed and arranged to connect the various components of the electronic environment 100 together to enable these components to exchange electronic signals 140 (e.g., see the double arrow 140). At least a portion of the communications medium 106 is illustrated as a cloud to indicate that the communications medium 106 is capable of having a variety of different topologies including backbone, hub and spoke, loop, irregular, combinations thereof, and so on. Along these lines, the communications medium 106 may include copper-based data communications devices and cabling, fiber optic devices and cabling, wireless devices, combinations thereof, etc. Furthermore, the communications medium 106 is capable of supporting LAN-based communications, SAN-based communications, cellular communications, WAN-based communications, distributed infrastructure communications, other topologies, combinations thereof, etc.

The other devices 108 represent other possible componentry of the electronic environment 100. Along these lines, the other devices 108 may include remote data storage equipment that provides data to and/or receives data from the data storage equipment 104 (e.g., replication arrays, backup and/or archiving equipment, service processors and/or management/control devices, combinations thereof, etc.).

During operation and as will be explained in further detail shortly, the storage processing circuitry 130 receives a read request from a particular host computer 102. The read request designates a set of storage locations (e.g., pages of LBA space) from which to read data. In response, the storage processing circuitry 130 establishes a set of write indicators corresponding to the set of storage locations and buffers data from the set of storage locations. The storage processing circuitry 130 then checks the set of write indicators to ascertain whether the set of storage locations has been designated to be written to since establishing the set of write indicators. If the set of storage locations has not been designated to be written to since establishing the set of write indicators, the storage processing circuitry 130 provides the buffered data to the host computer 102 to service the read request. Advantageously, in these situations, the storage processing circuitry 130 avoids needing to obtain a lock on the set of storage locations, minimizing resources and overhead needed to service the read request (e.g., processing cycles, memory space, waiting times, latency, and so on). Further details will now be provided with reference to FIG. 2.

Figure 2:
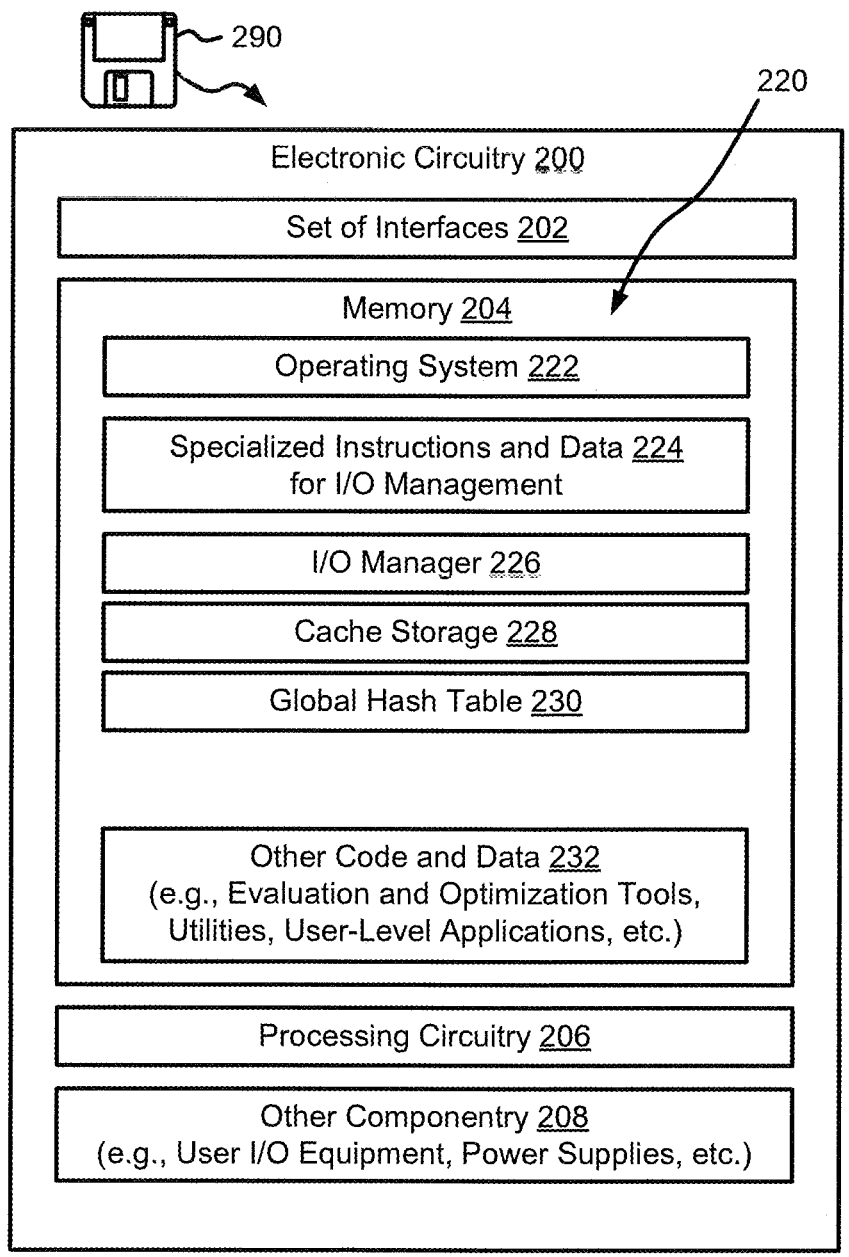
FIG. 2 is a block diagram of electronic circuitry in accordance with certain embodiments.

FIG. 2 is a block diagram of electronic circuitry 200 which is suitable for at least a portion of the data storage equipment 104 (FIG. 1) in accordance with certain embodiments. The electronic circuitry 200 includes a set of interfaces 202, memory 204, processing circuitry 206, and other componentry 208.

The set of interfaces 202 is constructed and arranged to connect the electronic circuitry 200 to the communications medium 106 to enable communications with other devices in the electronic environment 100 (e.g., the host computers 102). In some embodiments, the communications are IP-based, SAN-based, cellular-based, cable-based, fiber-optic-based, wireless, cloud-based, combinations thereof, etc. Additionally, the set of interfaces 202 is constructed and arranged to connect the electronic circuitry 200 to other local equipment such as the set of storage devices 132. In some embodiments, the set of interfaces 202 includes one or more host interfaces (e.g., a computer network interface, a fibre-channel interface, etc.), one or more storage device interfaces (e.g., a host adapter or HBA, etc.), and other interfaces. As a result, the set of interfaces 202 enables the electronic circuitry 200 to robustly and reliably communicate with various apparatus.

The memory 204 includes both volatile storage (e.g., DRAM, SRAM, etc.) and non-volatile storage (e.g., flash memory, magnetic memory, etc.). The memory 204 stores a variety of software constructs 220 including an operating system 222, specialized instructions and data 224, a I/O manager 226, cache storage 228, a global hash table 230, and other code and data 232.

The operating system 222 refers to particular control code such as a kernel to manage computerized resources (e.g., processor cycles, memory space, etc.), the I/O stack (e.g., drivers), and so on. The specialized instructions and data 224 refer to particular instructions for I/O management. In some arrangements, the specialized instructions and data 224 are tightly integrated with or part of the operating system 222 itself.

The I/O manager 226 is constructed and arranged to execute the specialized instructions and data 226 to service the host I/O requests 120. Along these lines, in some embodiments, the I/O manager 226 is constructed and arranged to buffer data into the cache storage 228 and provide the buffered data to the host computers 102. In some embodiments, the I/O manager 226 is constructed and arranged to receive write data from the host computers 102 and store the write data into the cache storage 228.

In some embodiments, the I/O manager 226 is constructed and arranged to generate and/or modify data objects corresponding to storage locations (e.g., data pages in LBA space) designated in the host I/O requests 120. In some embodiments, these data objects include write indicators and location descriptors.

In some embodiments, the write indicators are data objects constructed and arranged to indicate whether respective storage locations have been designated to be written to. Along these lines, in some embodiments, each write indicator is constructed and arranged to have a first state (e.g., an "alive" state) that indicates that the respective storage location has not been designated to be written to. Further, in some embodiments, each write indicator is constructed and arranged to have a second state (e.g., a "dead" state) that indicates that a respective storage location has not been designated to be written to.

In some embodiments, the location descriptors are data objects constructed and arranged to provide access to buffered data in the cache storage 228. Along these lines, in some embodiments, each location descriptor is constructed and arranged to store a respective pointer to data stored in the cache storage 228.

In some embodiments, the write indicators and the location descriptors are structurally similar data objects that are distinguished based on their contents. Along these lines, in some embodiments, the I/O manager 226 is constructed and arranged to identify a data object as either a write indicator or a location descriptor based on whether the data object is configured to contain a pointer to data. In these embodiments, if the data object is configured to contain such a pointer, then the I/O manager 226 identifies the data object as a location descriptor. However, if the data object is not configured to contain such a pointer, then the I/O manager 226 identifies the data object as a write indicator.

In some embodiments, the I/O manager 226 is further constructed and arranged to perform a lookup operation for the data objects. Along these lines, in some embodiments, the I/O manager 226 is constructed and arranged to search the global hash table 230 for the data objects.

In some embodiments, the I/O manager 226 is further constructed and arranged to maintain a pointer to a data object and refer back to the data object using the pointer, e.g., after buffering data stored at a corresponding storage location.

In some embodiments, the I/O manager 226 is further constructed and arranged to request, obtain, and release locks on storage locations, e.g., when performing a write operation or when a lockless read operation has already been attempted.

The cache storage 228 is constructed and arranged to store data. Along these lines, in some embodiments, the cache storage 228 is constructed and arranged to store data buffered from the set of storage devices 132, e.g., in response to a read request. Further, in some embodiments, the cache storage 228 is constructed and arranged to store data received from the host computers 102, e.g., in response to a write request.

The global hash table 230 is a data structure constructed and arranged to contain data objects corresponding to storage location (e.g., pages of LBA space). In some embodiments, the global hash table 230 includes multiple buckets having respective bucket index values. In some embodiments, each bucket is constructed and arranged to include a linked list of data objects (e.g., the write indicators and the location descriptor).

The other code and data 232 include applications and routines to provide additional operations and services (e.g., performance measurement tools, etc.), user-level applications, administrative tools, utilities, and so on.

It should be understood that FIG. 2 is provided for example purposes, and various changes in form and details may be made without departing from the spirit and scope of the present disclosure. For example, in some embodiments, separate I/O managers and/or caches are provided to service different types of I/O requests. Further, in some embodiments, rather than the global hash table 230, a different (or no) data structure is used to manage the write indicators and/or location descriptors.

During operation, after receiving a read request from a host computer 102, the I/O manager 226 generates a set of write indicators corresponding to a set of storage locations (e.g., a set of pages of LBA space) designated by the read request. The I/O manager 226 then buffers data from the set of storage locations. After buffering the data from the set of storage locations, the I/O manager 226 checks the set of write indicators to ascertain whether the set of storage locations has been designated to be written to since establishing the set of write indicators. If the set of storage locations has not been designated to be written to since establishing the set of write indicators, the I/O manager 226 provides the buffered data to the host computer 102 without needing to obtain a lock on the set of storage locations. Further details will now be provided with reference to FIG. 3.

Figure 3:
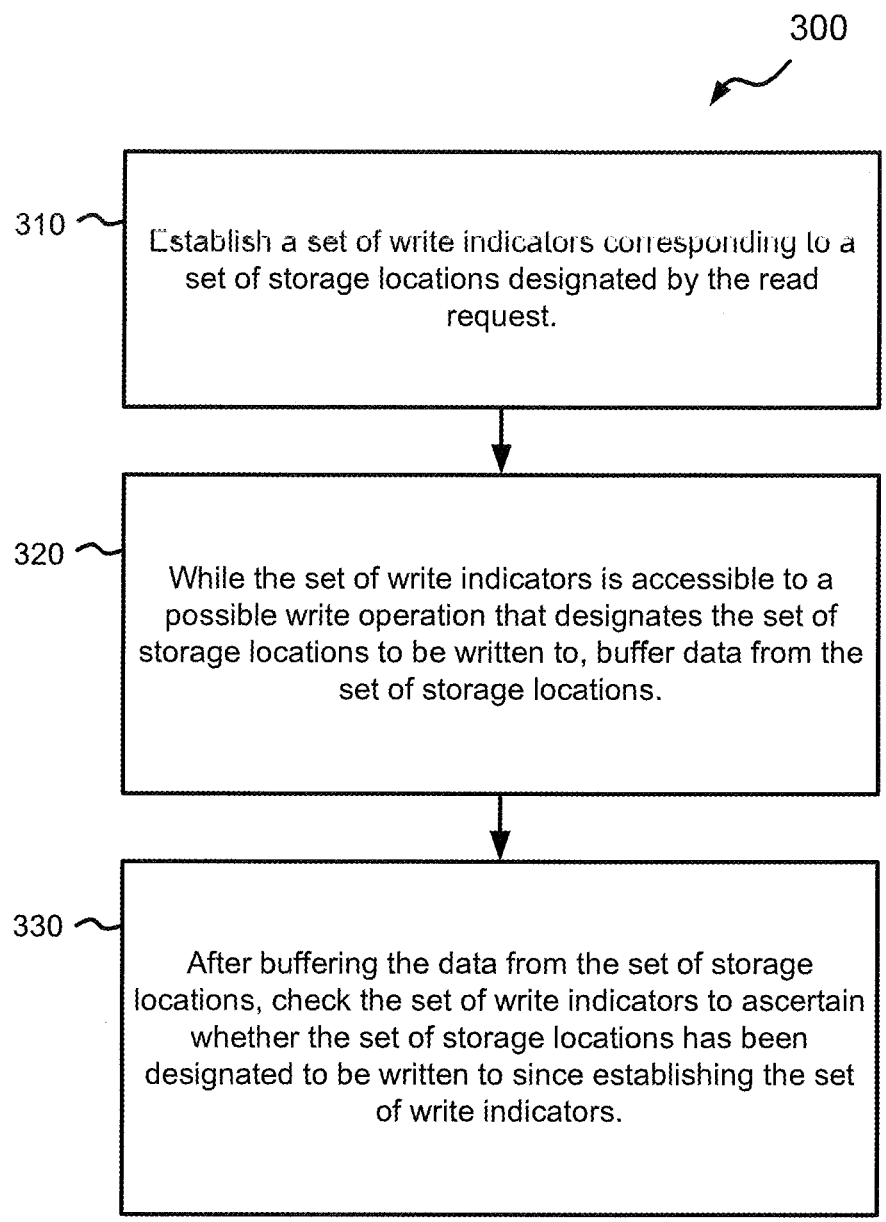
FIG. 3 is a flowchart of a procedure which is performed by specialized equipment in accordance with certain embodiments to service a read request.

FIG. 3 is a flowchart of a procedure 300 which is performed by specialized equipment in accordance with certain embodiments. The procedure 300 carries out a method of servicing a read request.

At 302, the I/O manager 226 (FIG. 2) establishes a set of write indicators corresponding to a set of storage locations designated by the read request. In some embodiments, the set of storage locations is a set of pages of LBA space.

In some embodiments, establishing the set of write indicators includes performing a lookup operation that searches for a set of data objects corresponding to the set of storage locations, and generating the set of write indicators in response to the lookup operation failing to locate the set of data objects.

In some embodiments, establishing the set of write indicators further includes the set of write indicators into the global hash table 230 to make the set of write indicators accessible to other operations (e.g., a write operation, a separate read operation, combinations thereof, etc.). In some embodiments, the I/O manager 226 hashes metadata (e.g., an extent identifier and an LBA) of the set of storage locations to locate a set of bucket index values of the global hash table 230, and inserts the set of write indicators at a set of buckets corresponding to the set of bucket index values.

In some embodiments, establishing the set of write indicators further includes establishing a respective set of pointers that point to the set of write indicators. In some embodiments, the set of pointers provides access to the set of write indicators regardless of whether the set of write indicators remains in the global hash table 230.

At 304, while the set of write indicators is accessible to a possible write operation that designates the set of storage locations, the I/O manager 226 buffers the data from the set of storage locations. In some embodiments, the I/O manager 226 buffers the data without obtaining a lock on the set of storage locations.

At 306, after buffering the data from the set of storage location the I/O manager 226 checks the set of write indicators to ascertain whether the set of storage locations has been designated to be written to since establishing the set of write indicators.

It should be appreciated that, if the set of storage locations had not been designated to be written to, then the data stored at the set of storage locations had not changed while the data was being buffered. In this manner, data integrity is maintained, even if no locks had been obtained. Advantageously, refraining from obtaining a lock on the set of storage locations enables the I/O manager 226 to quickly and efficiently service the read request without spending resources (e.g., time, computing cycles, combinations thereof, etc.) on obtaining a lock. Further details will now be provided with reference to FIG. 4.

Figure 4:
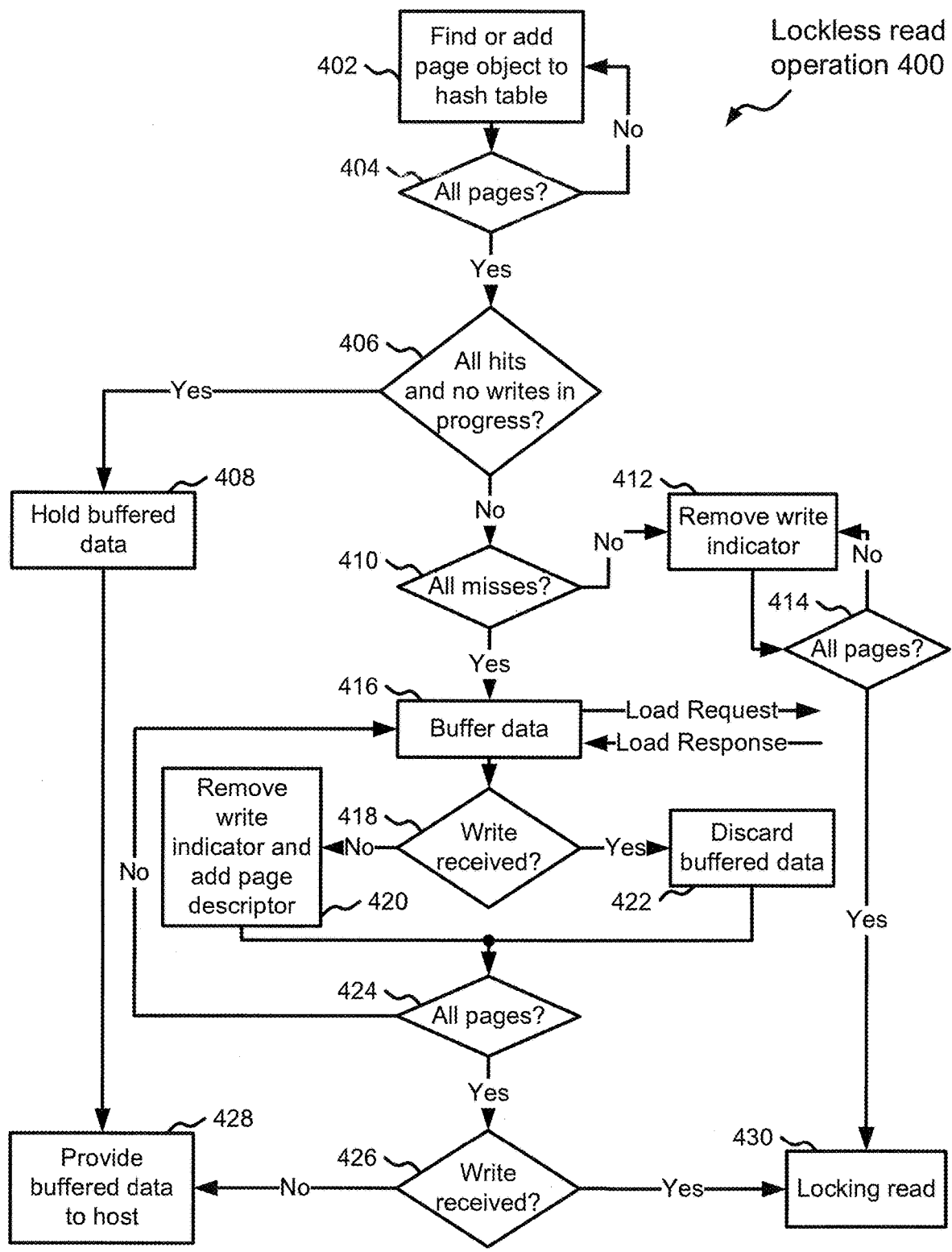
FIG. 4 shows a flowchart of a lockless read operation in accordance with certain embodiments.

FIG. 4 is a flowchart of a lockless read operation 400 which is performed by specialized equipment in accordance with certain embodiments. In some embodiments, the lockless read operation 400 services a read request from a host computer 102 (FIG. 1).

At 402, the I/O manager 226 (FIG. 2) performs a lookup operation for a data object (e.g., a write indicator or location descriptor) corresponding to a storage location (e.g., a page of LBA space) designated by the read request. If the I/O manager 226 fails to find such a data object, the I/O manager 226 establishes (or generates) a write indicator corresponding to the storage location.

In some embodiments, the lookup operation includes hashing metadata of the storage location as a hash key to generate a bucket index value of a hash table, e.g., the global hash table 230. In some embodiments, the metadata includes an extent identifier and an LBA value of the storage location.

In some embodiments, multiple keys hash to the same bucket index value, and each bucket of the hash table may contain multiple data objects corresponding to respective storage locations (e.g., in a linked list). In these embodiments, after generating the bucket index value, the lookup operation further searches a respective bucket for the data object corresponding the storage location.

In some embodiments, if the lookup operation fails to locate a data object corresponding to the storage location, the I/O manager 226 establishes a write indicator corresponding to the storage location. In some embodiments, the I/O manager 226 establishes the write indicator by inserting the write indicator into (or associating the write indicator with) a respective bucket of the hash table. In some embodiments, the I/O manager 226 further establishes a pointer to the write indicator to access the write indicator regardless of whether the write indicator remains in the hash table.

At 404, the I/O manager 226 repeats the lookup operation for any remaining storage locations designated by the read request. Once the I/O manager 226 has performed the lookup operation for all the designated storage locations, the lockless read operation 400 proceeds to 406.

At 406, the I/O manager 226 performs a cache search operation that checks whether the cache storage 228 contains data previously buffered from the designated storage locations (a cache hit). Further, in some embodiments, the I/O manager 226 checks whether any write operations for the designated storage locations are in progress. If the cache search operation results in all cache hits and no write operations are in progress, the lockless read operation proceeds to 408. Otherwise, the lockless read operation proceeds to 410.

In some embodiments, the cache search operation is performed as part of (or simultaneously with) the lookup operation. Along these lines, in some embodiments, if the lookup operation locates a data object, the I/O manager 226 further identifies what type of data object was found, e.g., a location descriptor or a write indicator. If the data object contains a pointer to data in the cache storage 228 (e.g., the data object is a location descriptor), then the cache search operation results in a cache hit. However, if the data object does not contain a pointer to data in the cache storage 228 (e.g., the data object is a write indicator), then the cache search operation results in a cache miss. Further, in some embodiments, if the lookup operation does not locate a data object corresponding to a particular storage location, then the cache search operation also results in a cache miss.

At 408, the I/O manager 226 instructs the cache storage 228 to hold the data buffered from the designated storage locations to prevent the cache storage 228 from removing the data. It should be appreciated that, if the cache storage 228 already contains the data and no write operations are in progress, then the I/O manager 226 can service the read request without accessing the storage locations designated by the read request. Further, in some embodiments, the cache storage 228 spends fewer resources (e.g., time, computing cycles, combinations thereof, etc.) to place a hold on the data compared to obtaining a lock. In this manner, the I/O manager 226 is configured to quickly and efficiently provide the buffered data to a host without obtaining a lock on the designated storage locations.

At 410, the I/O manager 226 ascertains whether the cache search operation resulted in all cache misses, i.e., the cache manager 228 does not contain data that was previous buffered from the designated storage locations. If the search operation does not result in all cache misses, the lockless read operation 400 proceeds to 412. Otherwise, the lockless read operation 400 proceeds to 416.

At 412 and 414, where there is a mix of cache hits and cache misses, the lockless read operation 400 removes the write indicators to prepare for a separate read operation (e.g., a locking read operation 600 (FIG. 6)) to service the read request. It should be appreciated that, in some embodiments, it is desirable to minimize the risk of data corruption by providing either all newly buffered data or all previously buffered data in response to a read request. Accordingly, in some embodiments, the I/O manager 226 performs the separate read operation to buffer data to the cache storage 228, regardless of whether the data was previously buffered.

In some embodiments, when removing the write indicators, the I/O manager 226 further establishes location descriptors corresponding to the storage locations designated in the read request. Advantageously, by establishing locations descriptors when removing the write indicators, the I/O manager 226 avoids needing to reperform lookup operations to search for data objects corresponding to the storage locations when performing the separate read operation.

At 416, the I/O manager 226 buffers data from a designated storage location. Along these lines, in some embodiments, the I/O manager 226 sends a load request to the set of storage devices 132 (FIG. 1) and receives a response containing the data from the set of storage devices 132. After buffering the data, the lockless read operation 400 proceeds to 418.

At 418, the I/O manager 226 checks whether a write request has designated the storage location to be written to since establishing its corresponding write indicator. If a write request has not designated the same storage location to be written to, then the lockless read operation 400 proceeds to 420. Otherwise, the lockless read operation proceeds to 422.

In some embodiments, the I/O manager 226 accesses the write indicator corresponding to the storage location to check whether the storage location has been designated to be written to. In some embodiments, the I/O manager 226 uses a pointer to access the write indicator (e.g., the pointer described above in relation to step 402).

In some embodiments, the I/O manager 226 checks a status of the write indicator to ascertain whether a write request has designated the storage location to be written to. Along these lines, in some embodiments, when the write indicator is first established, the I/O manager 226 sets the write indicator to a first state (e.g., an "alive" state). Later, if the write request arrives, the I/O manager 226 switches the write indicator to a second state (e.g., a "dead" state).

At 420, the I/O manager 226 establishes (or generates) a location descriptor corresponding to the storage location. In some embodiments, the I/O manager 226 removes (or disassociates) the write indicator from a bucket of a hash table and establishes the location descriptor by inserting the location descriptor into (or associating the location descriptor with) the same bucket. In some embodiments, the location descriptor provides access to the buffered data in the cache storage 228, e.g., by containing a pointer to the buffered data. After establishing the location descriptor, the lockless read operation 400 proceeds to 424.

At 422, the I/O manager 226 discards (or refrains from providing) the buffered data. As will be described in greater detail below, if a write request arrives, the I/O manager 226 may perform a separate read operation (e.g., a locking read operation 430) to ensure data integrity. After discarding the buffered data, the lockless read operation 400 proceeds to 424.

At 424, the I/O manager 226 repeats the check for any remaining storage locations designated by the read request. Once the I/O manager 226 has performed the check for each of the designated storage location, the lockless read operation 400 proceeds to 426.

At 426, after the I/O manager 226 buffers data for each of the storage locations designated in the read request, the I/O manager 226 checks whether a write request has designated any of the storage locations to be written to since establishing the write indicators corresponding to the storage location. If a write request has not designated any of the storage locations to be written to, then the lockless read operation 400 proceeds to 428. Otherwise, the lockless read operation proceeds to 430.

At 428, the I/O manager 226 provides the buffered data to the host computer 102, thus completing the lockless read operation 600. In some embodiments, the I/O manager 226 provides the buffered data by copying the buffered data from the cache storage 228 into a host buffer of the host computer 102.

At 430, the I/O manager 226 ends the lockless read operation 400 and instead performs a separate read operation (e.g., the locking read operation 600 discussed below in relation to FIG. 6). It should be appreciated that, in some embodiments, a vast majority of read operations do not conflict with write operations. Accordingly, in these embodiments, the I/O manager 226 rarely performs a separate read operation when servicing a read request.

Advantageously, the lockless read operation 400 enables an overall reduction in resource usage (e.g., processor cycles, memory usage, etc.) and overhead (e.g., wait times, latency, etc.) compared to conventional data storage systems that require locks to access data for every read request.

It should be appreciated that the lockless read operation 400 is provided for example purposes, and various changes in form and details may be made without departing from the spirit and scope of the present disclosure. For example, rather than performing a locking read operation if a write request arrives, in some embodiments, the I/O manager 226 may perform a different type of operation (e.g., retrying the lockless read operation, waiting for a corresponding write operation to finish, combinations thereof, etc.). The present disclosure is not limited in this regard. Further details will now be provided with reference to FIG. 5.

Figure 5:
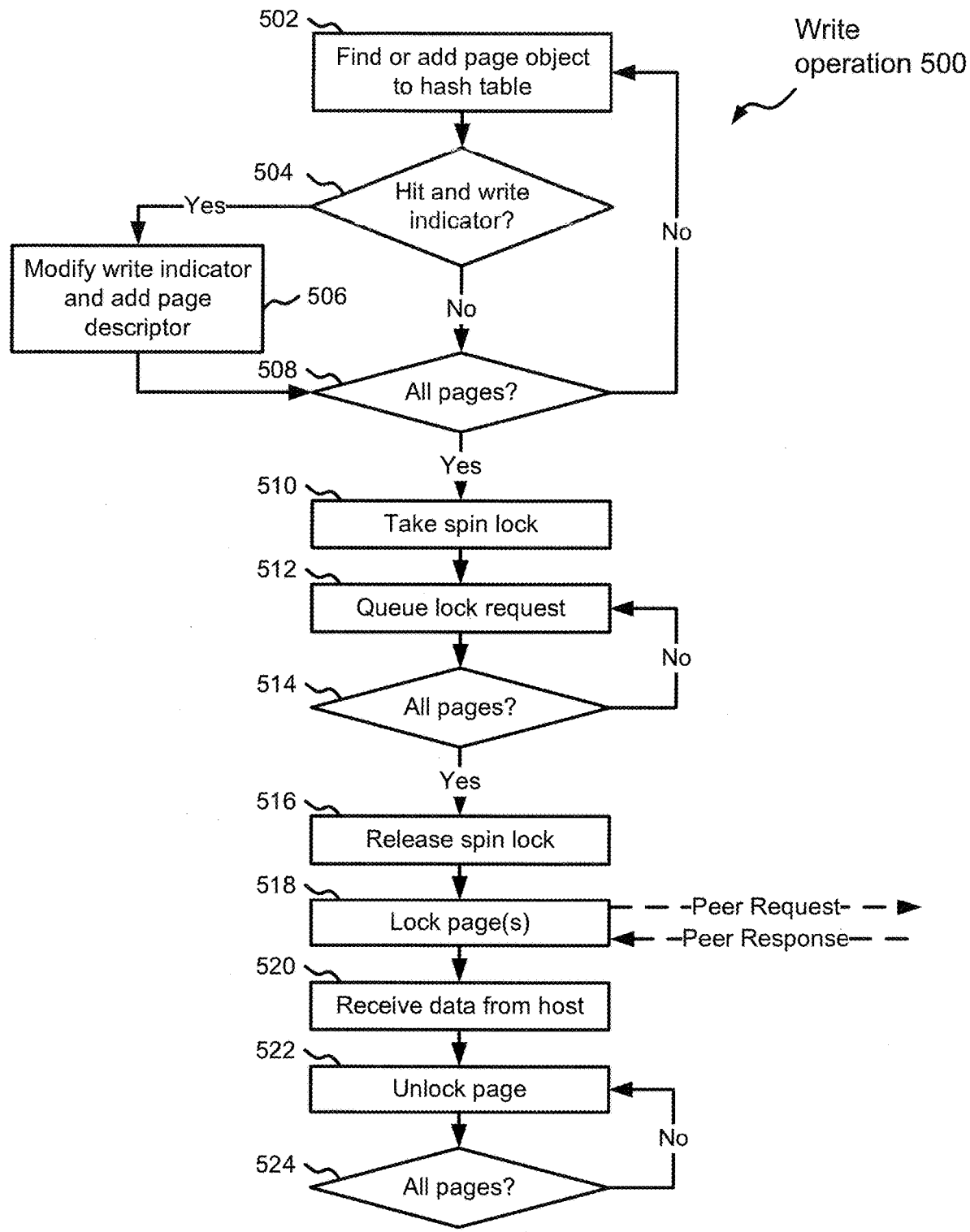
FIG. 5 shows a flowchart of a write operation in accordance with certain embodiments.

FIG. 5 is a flowchart of a write operation 500 which is performed by specialized equipment in accordance with certain embodiments. In some embodiments, the write operation 500 services a write request from a host computer 102 (FIG. 1).

At 502, the I/O manager 226 (FIG. 2) performs a lookup operation for a data object (e.g., a write indicator or location descriptor) corresponding to a storage location (e.g., a page of LBA space) designated by the write request. In some embodiments, the lookup operation is performed similarly to the lookup operation described above in regards to step 402 (FIG. 4). The write operation 500 then proceeds to 504.

At 504, if the lookup operation locates a data object corresponding to the storage location, the lookup operation checks whether the data object is a write indicator. If the data object is a write indicator, the write operation proceeds to 506. Otherwise, the write operation proceeds to 508.

At 506, the I/O manager 226 modifies the write indicator and establishes (or generates) a location descriptor corresponding to the storage location. The write operation then proceeds to 508.

In some embodiments, the I/O manager 226 modifies a status of the write indicator to indicate that a write request has designated the storage location to be written to. Along these lines, in some embodiments, when the write indicator is first established, the I/O manager 226 sets the write indicator to a first state (e.g., an "alive" state). Later, when the write request arrives, the I/O manager 226 switches the write indicator to a second state (e.g., a "dead" state).

In some embodiments, the I/O manager 226 removes (or disassociates) the write indicator from a bucket of a hash table and establishes the location descriptor by inserting the location descriptor into (or associating the location descriptor with) the same bucket. In some embodiments, the location descriptor provides access to the buffered data in the cache storage 228, e.g., by containing a pointer to the buffered data.

In some embodiments, the I/O manager 226 maintains access to the write indicator even after removing the write indicator from the bucket. Along these lines, in some embodiments, when the I/O manager 226 establishes the write indicator, the I/O manager 226 further establishes a pointer that provides access to the write indicator even if the write indicator is removed from the bucket.

At 508, the I/O manager 226 repeats the lookup operation for any remaining storage locations designated by the write request. Once the I/O manager 226 has performed the lookup operation for all the designated storage locations, the write operation 500 proceeds to 510.

At 510 through 516, the I/O manager 226 obtains a spinlock and atomically add lock requests to respective queues for the designated storage locations. The I/O manager 226 then releases the spinlock. In some embodiments, which include multiple storage processors (or nodes) that have shared access to the storage locations, the lock requests are local to a storage processor that services the write request. After adding the lock requests to the queues, the write operation 500 proceeds to 518.

At 518, when the locks become available (e.g., when the lock requests reach respective heads of the queues), the I/O manager 226 obtains the locks on the designated storage locations. In some embodiments, which include multiple storage processors (or nodes) that have shared access to the storage locations, the I/O manager 226 sends a peer request from the storage processor servicing the write request (a local storage processor) to another storage processor (a peer storage processor). In some embodiments, the peer storage processor grants permission to the local storage processor to obtain the locks and transmits a response. Once the I/O manager 226 obtains the locks, the write operation 500 proceeds to 520.

At 520, after the I/O manager 226 obtains the locks, the I/O manager 226 receives write data from the host computer 102. In some embodiments, the I/O manager 226 receives the write data by copying the data from a host buffer of a host computer 102 to the cache storage 228. After copying the write data from the host buffer, the write operation 500 then proceeds to 522.

At 522 and 524, the I/O manager 226 releases the locks on the storage locations designated in the write request, completing the write operation 500. Further details will now be provided with reference to FIG. 6.

Figure 6:
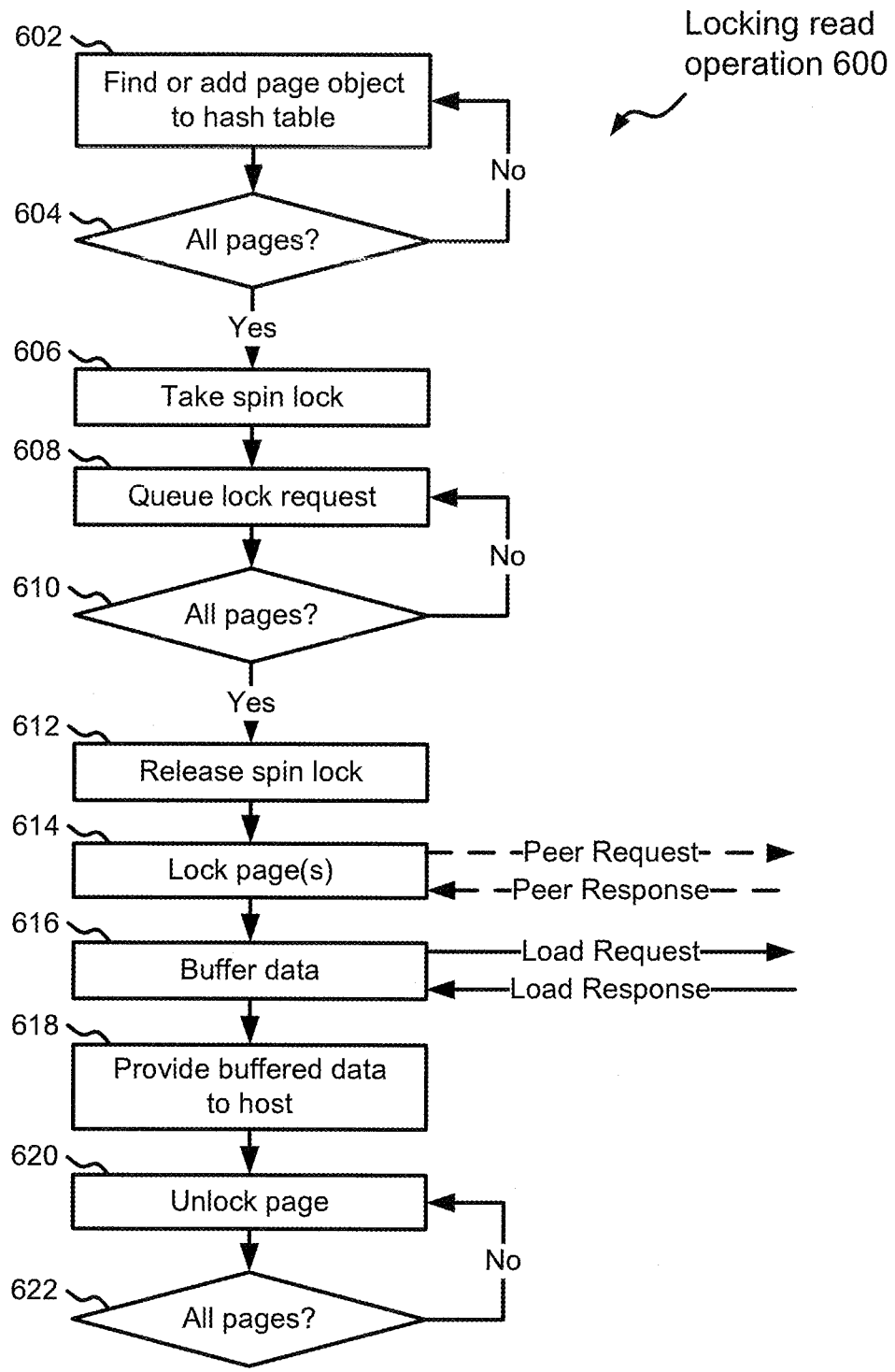
FIG. 6 shows a flowchart of a read operation in accordance with certain embodiments.

FIG. 6 is a flowchart of a locking read operation 600 which is performed by specialized equipment in accordance with certain embodiments. In some embodiments, the locking read operation 600 services a read request from a host computer 102 (FIG. 1). In some embodiments, the locking read operation 600 is performed only after attempting a lockless read operation, e.g., the lockless read operation 400 (FIG. 4).

At 602, the I/O manager 226 (FIG. 2) performs a lookup operation for a data object (e.g., a write indicator or location descriptor) corresponding to a storage location (e.g., a page of LBA space) designated by the read request. In some embodiments, the lookup operation is performed similarly to the lookup operation described above in regards to step 402 (FIG. 4).

At 604, the I/O manager 226 repeats the lookup operation for any remaining storage locations designated by the read request. Once the I/O manager 226 has performed the lookup operation for all the designated storage locations, the locking read operation 600 proceeds to 606.

It should be understood that, in some embodiments, separate operations alleviate the need to perform lookup operations in the locking read operation 600. For example, as discussed above in regards to steps 412 and 414 (FIG. 4), in some embodiments, the I/O manager 226 establishes location descriptors prior to performing the locking read operation 600. Advantageously, in these embodiments, the locking read operation 600 may simply proceed directly to 606 without performing lookup operations according to 602 and 604.

At 606 through 612, the I/O manager 226 obtains a spinlock and atomically add lock requests to respective queues for the designated storage locations. The I/O manager 226 then releases the spinlock. In some embodiments, which include multiple storage processors (or nodes) that have shared access to the storage locations, the lock requests are local to a storage processor that services the read request. After adding the lock requests to the queues, the locking read operation 600 proceeds to 614.

At 614, when the locks become available (e.g., when the lock requests reach respective heads of the queues), the I/O manager 226 obtains the locks on the designated storage locations. In some embodiments, which include multiple storage processors (or nodes) that have shared access to the storage locations, the I/O manager 226 sends a peer request from the storage processor servicing the read request (a local storage processor) to another storage processor (a peer storage processor). In some embodiments, the peer storage processor grants permission to the local storage processor to obtain the locks and transmits a response. Once the I/O manager 226 obtains the locks, the locking read operation 600 then proceeds to 616.

At 616, after the I/O manager 226 obtains the locks, the I/O manager buffers data from the designated storage locations. In some embodiments, the I/O manager 226 sends a load request to the set of storage devices 132 (FIG. 1) and receives a response containing the data from the set of storage devices 132. After buffering the data, the locking read operation 600 proceeds to 618.

At 618, the I/O manager 226 provides the buffered data to the host computer 102. In some embodiments, the I/O manager 226 provides the buffered data by copying the buffered data from the cache storage 228 to a host buffer of the host computer 102.

At 618, the I/O manager 226 provides the buffered data to the host computer 102. In some embodiments, the I/O manager 226 provides the buffered data by copying the buffered data from the cache storage 228 to a host buffer of the host computer 102.

At 620 and 622, the I/O manager 226 releases the locks on the storage locations designated in the write request, completing the locking read operation 600.

In some embodiments, performing the lockless read operation 400 entails significantly fewer resources and/or overhead (e.g., computing cycles, waiting times, latency, combinations thereof, etc.) compared to the locking read operation 600. Thus, in some embodiments, the lockless read operation 400 is attempted before the potentially performing locking read operation 600.

It should be appreciated that, in some embodiments, a large majority of read operations complete without a conflicting write operation occurring. Thus, in most instances, the lockless read operation 400 services the read requests without needing to perform the locking read operation 600. In this manner, servicing read requests occurs without expending resources on obtaining locks.

As described above, an improved technique is directed to operating storage processing circuitry to service read requests without obtaining locks. Along these lines, when servicing a read request, the storage processing circuitry creates a set of write indicators (e.g., placeholders used to identify write requests) for storage locations designated in the read request. After buffering data, the storage processing circuitry checks the write indicators to ascertain whether any write requests have designated the same storage locations as the read request. Thus, the storage processing circuitry maintains data integrity without needing to spend resources on obtaining locks on the storage locations.

One should appreciate that the above-described techniques do not merely collect and store data. Rather, the disclosed techniques provide an improvement to the operation of storage system technology by servicing read requests using fewer overall resources (e.g., computing cycles, memory usage, etc.) and reducing overhead (e.g., waiting times, latency, etc.).

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 100 such as the data storage equipment 104, etc. are capable of being implemented in or "moved to" the cloud, i.e., to remote computer resources distributed over a network. Here, the various computer resources may be distributed tightly (e.g., a data storage system in a single facility) or over relatively large distances (e.g., over a campus, in different cities, coast to coast, etc.). In these situations, the network connecting the resources is capable of having a variety of different topologies including backbone, hub and spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN based communications, combinations thereof, and so on.

In a conventional multi-node active/active cache, IOs for the same LBAs (logical block addresses) can come in from the host into either node. One of the requirements of IO atomicity is that reads, when mixed with writes, must either return all new data or all old data. Data in the IO cannot be mixed. For example, if there are sixteen sectors of data with a current value of A . . . A, an outstanding 16 sector read for those pages, and an outstanding 16 sector write with the data B . . . B, the read must return either all As or all Bs, it should never return a mix of As and Bs.

The way that conventional data storage systems attempt to accomplish these requirements is through locking. In the conventional data storage systems, user LBA space is broken up into data pages, that is a logical unit at which LBA space is managed. The first IO to a page adds it to a global hash table so any racing IO requests can find the pages and a locking algorithm is employed to lock the pages atomically across the nodes to serialize between reads and writes. The current locking algorithm guarantees IO atomicity. At a high level, this is how reads and writes are handled.

However, this conventional method comes at a cost. While IOs always have the potential to race, the vast majority user IOs do not, and the lookup in the global hash table rarely results in a hit. This means, conventional data storage systems do some extra work to protect against a scenario that has a small chance of actually occurring.

In contrast to the conventional data storage systems, techniques disclosed herein improve the performance of read IOs by biasing the locking algorithm toward read and write misses. These techniques include lockless reads.

In a lockless read, some embodiments load the data first and without locking. Then, at the end of the IO, the embodiments add pages to the global hash table provided there has not been an intervening write that could race.

First, for read IOs, some embodiments only attempt a lockless read when all the lookups miss. This guarantees that the data has not been accessed recently, and reduces the odds of a contention and can all be loaded from disk at the same time. In that case, the pages are not added to the hash table as in a locking read. And then, because read pages are not in the hash table and cannot be seen by other IOs, in some embodiments, they are not locked. However, in some embodiments, the race between read and write is still coordinated as, even though it is rare, it could still potentially happen. For that, some embodiments use the concept of placeholder pages. These are "pages" added into the global hash table simply to note that a read is occurring. If another read IO finds one of these pages, it can also treat this page as a "miss" and it will do its reading independently and locklessly. In some embodiments, a write IO, on the other hand, is never blocked by a placeholder read page. In these embodiments, if a write IO finds a placeholder page, it removes the page from the global hash table, replaces it with a regular page, and does IO as normal. When a read IO has finished, each page in the IO is evaluated. If the placeholder page is still in the global hash table, it is replaced with the fully loaded page just read from disk. If the placeholder page was removed from the global hash, that means a write has raced with the read and we can't be sure we have the correct data, so the read buffer is discarded. Then, after evaluating the entire read IO, if any placeholder pages were found to be removed, the read IO will be retried from the top, starting with the global hash table lookup.

In some embodiments, another case where reads can be done locklessly is when all the pages are a hit in the global hash table and are all fully loaded with no writes in progress. In this case, cache also has a consistent view of the data and the requirement to lock can be loosened. In this case, the pages are "held" in cache for the duration of the read IO. That is, they are prevented from being purged from the global hash table, either due to overwrites or the need to reclaim pages. No load needs to be done and the data can be immediately returned to the initiator without fear of racing with a write.

The effect of these embodiments is that access is biased toward hash table misses. When the majority of accesses are missed, CPU cycles can be saved because these embodiments can avoid the overhead from locking and the latency of potentially having to send lock requests to the other node.

In some embodiments, the lockless read algorithm proceeds as follows (see FIG. 4):

1. For each page in the IO request, find the page in the global hash table.
   a. If the page cannot be found, add a placeholder page.
   b. If the page was found, check if the page is loaded.
      i. If the page is unloaded, abandon lockless reading.
      ii. If the page is loaded, check if any writes are in progress.
         1. If no writes are in progress, "hold" the page.
         2. If writes are in progress, abandon lockless reading.
2. For each page in the IO request, if the data is not already in memory, load the data from the Mapper component.
3. For each page in the IO request, check to see if the placeholder page is still alive.
   a. If it is, add the loaded page to the global hash table.
   b. If not, discard the data.
4. If any placeholder page were added and at least one died, restart the IO using the locking protocol.
5. If all the placeholders are alive or there were no placeholder pages, copy the data from the host buffer into the cache buffer.

In some embodiments, the write algorithm proceeds as follow (see FIG. 5):

1. Find or add the pages in a hash table.
2. If the page is found and it is a placeholder page, remove it and replace with a real page.
3. Using a spinlock, atomically add local lock requests to each page in the IO request.
4. Lock the pages, which may involve sending lock requests to the peer node.
5. Copy the data from the host buffer into the cache buffer.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of servicing a read request, comprising:
establishing a set of write indicators corresponding to a set of storage locations designated by the read request;
while the set of write indicators is accessible to a possible write operation that designates the set of storage locations to be written to, buffering data from the set of storage locations; and
after buffering the data from the set of storage locations, checking the set of write indicators to ascertain whether the set of storage locations has been designated to be written to since establishing the set of write indicators.

2. The method of claim 1, further comprising:
after checking the set of write indicators, providing the buffered data to a host based on the set of write indicators indicating that the set of storage locations has not been designated to be written to since establishing the set of write indicators.

3. The method of claim 1, further comprising:
based on the set of write indicators indicating that the set of storage locations has not been designated to be written to since establishing the set of write indicators, establishing a set of descriptors constructed and arranged to provide access to the buffered data from a cache.

4. The method of claim 3, wherein establishing the set of descriptors includes:
modifying the set of write indicators to disassociate the set of write indicators from the set of storage locations; and
associating the set of descriptors with the set of storage locations, the set of descriptors including a set of pointers to the buffered data in the cache.

5. The method of claim 3, further comprising:
after establishing the set of descriptors, receiving a subsequent read request designating the set of storage locations to access;
in response to receiving the subsequent read request, providing an instruction to retain the buffered data in the cache to prevent the buffered data from being removed from the cache; and
after providing the instruction to retain the buffered data, providing the buffered data from the cache to service the subsequent read request.

6. The method of claim 1, further comprising:
after establishing the set of write indicators, receiving another read request designating the set of storage locations to access; and
after receiving the other read request, performing a lookup operation that identifies the set of write indicators corresponding to the set of storage locations, the set of write indicators indicating a cache miss for the data corresponding to the set of storage locations.

7. The method of claim 1, wherein establishing the set of write indicators includes:
performing a lookup operation that hashes metadata of the set of storage locations to identify a set of index values of a hash table; and
after performing the lookup operation, inserting the set of write indicators into the hash table at the set of index values to associate the set of storage locations with the set of write indicators.

8. The method of claim 1, further comprising:
establishing a second set of write indicators corresponding to a second set of storage locations designated by a second read request;
after establishing the second set of write indicators, receiving a write request designating the second set of storage locations to be written to; and
in response to receiving the write request, modifying the second set of write indicators to indicate that the second set of storage locations has been designated to be written to.

9. The method of claim 8, further comprising:
while the second set of write indicators is accessible to the possible write operation that designates the second set of storage locations, buffering other data from the second set of storage locations;
after buffering the other data from the set of storage locations, checking the second set of write indicators to ascertain whether the second set of storage locations has been designated to be written to since establishing the second set of write indicators; and
after checking the second set of write indicators, refraining from providing the other data to a host based on the second set of write indicators indicating that the second set of storage locations has been designated to be written to since establishing the second set of write indicators.

10. An electronic environment, comprising:
memory; and
control circuitry coupled with the memory, the memory storing instructions that, when carried out by the control circuitry, cause the control circuitry to perform a method of servicing a read request, the method including:
establishing a set of write indicators corresponding to a set of storage locations designated by the read request;
while the set of write indicators is accessible to a possible write operation that designates the set of storage locations to be written to, buffering data from the set of storage locations; and
after buffering the data from the set of storage locations, checking the set of write indicators to ascertain whether the set of storage locations has been designated to be written to since establishing the set of write indicators.

11. The electronic environment of claim 10, wherein the method further includes:
after checking the set of write indicators, providing the buffered data to a host based on the set of write indicators indicating that the set of storage locations has not been designated to be written to since establishing the set of write indicators.

12. The electronic environment of claim 10, wherein the method further includes:
based on the set of write indicators indicating that the set of storage locations has not been designated to be written to since establishing the set of write indicators, establishing a set of descriptors constructed and arranged to provide access to the buffered data from a cache.

13. The electronic environment of claim 12, wherein establishing the set of descriptors includes:
modifying the set of write indicators to disassociate the set of write indicators from the set of storage locations; and associating the set of descriptors with the set of storage locations, the set of descriptors including a set of pointers to the buffered data in the cache.

14. The electronic environment of claim 12, wherein the method further includes:
  after establishing the set of descriptors, receiving a subsequent read request designating the set of storage locations to access;
  in response to receiving the subsequent read request, providing an instruction to retain the buffered data in the cache to prevent the buffered data from being removed from the cache; and
  after providing the instruction to retain the buffered data, providing the buffered data from the cache to service the subsequent read request.

15. The electronic environment of claim 10, wherein the method further includes:
  after establishing the set of write indicators, receiving another read request designating the set of storage locations to access; and
  after receiving the other read request, performing a lookup operation that identifies the set of write indicators corresponding to the set of storage locations, the set of write indicators indicating a cache miss for the data corresponding to the set of storage locations.

16. The electronic environment of claim 10, wherein establishing the set of write indicators includes:
  performing a lookup operation that hashes metadata of the set of storage locations to identify a set of index values of a hash table; and
  after performing the lookup operation, inserting the set of write indicators into the hash table at the set of index values to associate the set of storage locations with the set of write indicators.

17. The electronic environment of claim 10, wherein the method further includes:
  establishing a second set of write indicators corresponding to a second set of storage locations designated by a second read request;
  after establishing the second set of write indicators, receiving a write request designating the second set of storage locations to be written to; and
  in response to receiving the write request, modifying the second set of write indicators to indicate that the second set of storage locations has been designated to be written to.

18. The electronic environment of claim 17, wherein the method further includes:
  while the second set of write indicators is accessible to the possible write operation that designates the second set of storage locations, buffering other data from the second set of storage locations;
  after buffering the other data from the set of storage locations, checking the second set of write indicators to ascertain whether the second set of storage locations has been designated to be written to since establishing the second set of write indicators; and
  after checking the second set of write indicators, refraining from providing the other data to a host based on the second set of write indicators indicating that the second set of storage locations has been designated to be written to since establishing the second set of write indicators.

19. A computer program product having a non-transitory computer readable medium that stores a set of instructions to manage storage devices, the set of instructions, when carried out by computerized circuitry, causes the computerized circuitry to perform a method of:
  establishing a set of write indicators corresponding to a set of storage locations designated by the read request;
  while the set of write indicators is accessible to a possible write operation that designates the set of storage locations to be written to, buffering data from the set of storage locations; and
  after buffering the data from the set of storage locations, checking the set of write indicators to ascertain whether the set of storage locations has been designated to be written to since establishing the set of write indicators.

* * * * *